US011753483B2

(12) United States Patent
Kitaguchi et al.

(10) Patent No.: US 11,753,483 B2
(45) Date of Patent: Sep. 12, 2023

(54) HYDROXYPROPYL METHYL CELLULOSE ACETATE SUCCINATE AND METHOD FOR PRODUCING THE SAME

(71) Applicant: Shin-Etsu Chemical Co., Ltd., Tokyo (JP)

(72) Inventors: Taishi Kitaguchi, Niigata (JP); Junichi Matsubara, Niigata (JP); Mitsuhiro Yoshida, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 17/083,615

(22) Filed: Oct. 29, 2020

(65) Prior Publication Data

US 2021/0130497 A1    May 6, 2021

(30) Foreign Application Priority Data

Nov. 1, 2019   (JP) ................. 2019-200033

(51) Int. Cl.
| | | |
|---|---|---|
| *C08B 3/16* | (2006.01) | |
| *B01F 7/00* | (2006.01) | |
| *B01F 27/1122* | (2022.01) | |
| *B01F 27/1125* | (2022.01) | |
| *B01F 27/1145* | (2022.01) | |

(52) U.S. Cl.
CPC ............ *C08B 3/16* (2013.01); *B01F 27/1122* (2022.01); *B01F 27/1125* (2022.01); *B01F 27/1145* (2022.01)

(58) Field of Classification Search
CPC .. C08B 3/16; C08B 13/00; C08L 1/32; A61K 47/38; B01J 19/18
USPC ................................. 536/64–66, 68
See application file for complete search history.

(56) References Cited

U.S. PATENT DOCUMENTS

| | | | |
|---|---|---|---|
| 3,456,599 A | 7/1969 | Baker | |
| 3,629,237 A | 12/1971 | Koyanagi et al. | |
| 5,008,113 A * | 4/1991 | Kokubo ............... | A61K 9/2866 424/490 |
| 5,700,929 A | 12/1997 | Kokubo et al. | |
| 2012/0165517 A1* | 6/2012 | Uehira .................... | C08L 1/32 536/63 |
| 2018/0116968 A1 | 5/2018 | Matsubara et al. | |
| 2018/0273646 A1 | 9/2018 | Appeil | |
| 2019/0038592 A1 | 2/2019 | Wan et al. | |
| 2020/0064752 A1 | 2/2020 | Nannichi et al. | |

FOREIGN PATENT DOCUMENTS

| | | | |
|---|---|---|---|
| CN | 101027175 A | 8/2007 | |
| CN | 104755503 A | 7/2015 | |
| EP | 2810660 A1 * | 12/2014 | ............. C08B 11/08 |
| EP | 3290443 A1 | 3/2018 | |
| JP | S4643104 | 12/1971 | |
| JP | H04293901 A | 10/1992 | |
| JP | H08333401 A | 12/1996 | |
| KR | 20180048366 A | 5/2018 | |
| WO | 2006033459 A1 | 3/2006 | |
| WO | 2014031447 A1 | 2/2014 | |
| WO | 2018116658 A1 | 6/2018 | |

OTHER PUBLICATIONS

Extended European Search Report corresponding to European Patent Application No. 20204427.7 (9 pages) (dated Apr. 1, 2021).
Extended European Search Report corresponding to European Patent Application No. 20204429.3 (9 pages) (dated Apr. 1, 2021).
Green et al. "Mixing of Viscous Fluids, Pastes, and Doughs" in: Perry's Chemical Engineers' Handbook Eight Edition (McGraw-Hill 2008) pp. 18-31-18-32.
Office Action and English human translation corresponding to Japanese Patent Application No. 2019-200047 (6 pages) (dated Dec. 12, 2022).

* cited by examiner

*Primary Examiner* — Ganapathy Krishnan
(74) *Attorney, Agent, or Firm* — Myers Bigel, P.A.

(57) ABSTRACT

There is provided a method for producing hydroxypropyl methyl cellulose acetate succinate (HPMCAS), including an esterification step of reacting hydroxypropyl methyl cellulose with an acetylating agent and a succinoylating agent in the presence of an aliphatic carboxylic acid in a kneader reactor equipped with two or more stirring blades rotating around their own axes and orbitally revolving, to obtain a reaction product solution containing HPMCAS; a precipitation step of precipitating the HPMCAS by mixing the reaction product solution with water to obtain a suspension of the precipitated HPMCAS; and a washing and recovery step of washing the HPMCAS in the suspension and recovering the washed HPMCAS. Further, there is provided HPMCAS having yellowness at 20° C. of 15.0 or less, as determined in a 2% by mass solution of the HPMCAS in a mixed solvent of dichloromethane, methanol and water in a mass ratio of 44:44:10.

2 Claims, 4 Drawing Sheets

(a)

(b)

(c)

HYDROXYPROPYL METHYL CELLULOSE ACETATE SUCCINATE AND METHOD FOR PRODUCING THE SAME

BACKGROUND OF THE INVENTION

1. Field of the Invention

The invention relates to hydroxypropyl methyl cellulose acetate succinate and a method for producing the hydroxypropyl methyl cellulose acetate succinate.

2. Related Art

Hydroxypropyl methyl cellulose acetate succinate (another name: hypromellose acetate succinate; and hereinafter also referred to as "HPMCAS"), which is one of the enteric base materials, is widely used for a solid dispersion obtained by hot melt extrusion or spray drying, wherein the HPMCAS is used together with a water-insoluble drug. It is also widely used for coating to control the release of a drug.

In particular, an enteric coated preparation is one of the important preparations and is widely used for administering an acid-labile drug, protecting the gastric mucosa, or the like. In the production of an enteric coated preparation, there is generally used a method comprising steps of: dissolving HPMCAS in an organic solvent, and spraying the resulting solution to form an enteric coating on a surface of the preparation containing a drug. Since such coating is applied to the outermost surface of the preparation, the coloring of HPMCAS to be used for the coating is desirably as small as possible in consideration of production of colored preparations and the visual sensation of the preparation at the time of taking. In addition, from the viewpoint of spraying efficiently to form an enteric coated preparation, a solution of HPMCAS in an organic solvent preferably has a lower viscosity.

An esterified cellulose ether represented by HPMCAS can be produced in a known manner. For example, an esterified cellulose ether can be produced by a method in which a water-soluble cellulose ether is reacted with an acid anhydride as an esterification agent in an aliphatic carboxylic acid as a solvent in the presence of an alkali metal salt as a catalyst, by using a biaxial kneader (JPH08-333401A).

As an stirring device, a planetary kneader in which a rotating shaft is connected to an orbitally revolving shaft and a stirring blade simultaneously rotates around its axis and orbitally revolves in a tank, is used for the production of a developing liquid because of reduction of the dead space in the stirring tank and possible shortening of the kneading time (see FIGS. 1 to 3 in WO 2018/116658A).

SUMMARY OF THE INVENTION

The HPMCAS produced by the method described in JPH08-333401A is open for improvement of yellowness and a viscosity when dissolved in an organic solvent.

The invention has been made in view of the above circumstances, and an object of the invention is to provide HPMCAS having low yellowness and a low viscosity, and a method for producing the HPMCAS.

As a result of extensive studies to achieve the above object, the inventors have found that HPMCAS having low yellowness and a low viscosity when dissolved in an organic solvent can be produced by using a kneader reactor equipped with two or more stirring blades rotating around their own axes and orbitally revolving, in an esterification step in a method for producing the HPMCAS, and has completed the invention.

In an aspect of the invention, there is provided the method for producing hydroxypropyl methyl cellulose acetate succinate comprising:

an esterification step of reacting hydroxypropyl methyl cellulose with an acetylating agent and a succinoylating agent in the presence of an aliphatic carboxylic acid in a knead reactor equipped with two or more stirring blades rotating around their own axes and orbitally revolving, to obtain a reaction product solution containing hydroxypropyl methyl cellulose acetate succinate;

a precipitation step of precipitating the hydroxypropyl methyl cellulose acetate succinate by mixing the reaction product solution with water to obtain a suspension of the precipitated hydroxypropyl methyl cellulose acetate succinate; and a washing and recovery step of washing the hydroxypropyl methyl cellulose acetate succinate in the suspension and recovering the washed hydroxypropyl methyl cellulose acetate succinate.

In another aspect of the invention, there is provided hydroxypropyl methyl cellulose acetate succinate having yellowness at 20° C. of 15.0 or less, as determined in a 2% by mass solution of the hydroxypropyl methyl cellulose acetate succinate in a mixed solvent of dichloromethane, methanol and water in a mass ratio of 44:44:10.

According to the invention, there can be produced HPMCAS having low yellowness and a low viscosity when dissolved in an organic solvent, and the produced HPMCAS is useful as an enteric coating base material or the like.

DETAILED DESCRIPTION OF THE PREFERRED EMBODIMENTS

In the esterification step, an esterification reaction of hydroxypropyl methyl cellulose with an acetylating agent and a succinoylating agent is carried out in the presence of an aliphatic carboxylic acid in a kneader reactor equipped with two or more stirring blades rotating around their own axes and orbitally revolving to obtain a reaction product solution containing hydroxypropyl methyl cellulose acetate succinate.

The kneader reactor comprises two or more stirring blades rotating around their own axes and orbitally revolving, a rotation part for allowing the stirring blades to rotate on their own, a revolution part for allowing the stirring blades to orbitally revolve, and a reaction vessel. The rotation part for performing rotational motion is disposed in the revolution part for performing revolutionary motion. The kneader reactor allows not only stirring by the rotational motion but also stirring by the revolutionary motion. Such stirring by planetary motion allows the esterification reaction to be carried out while applying sufficient shearing force to the reaction solution for producing HPMCAS. From the viewpoint of applying adequate shearing force to the reaction solution for producing HPMCAS, the directions of the rotation and revolution are preferably opposite to each other.

Figure 1:
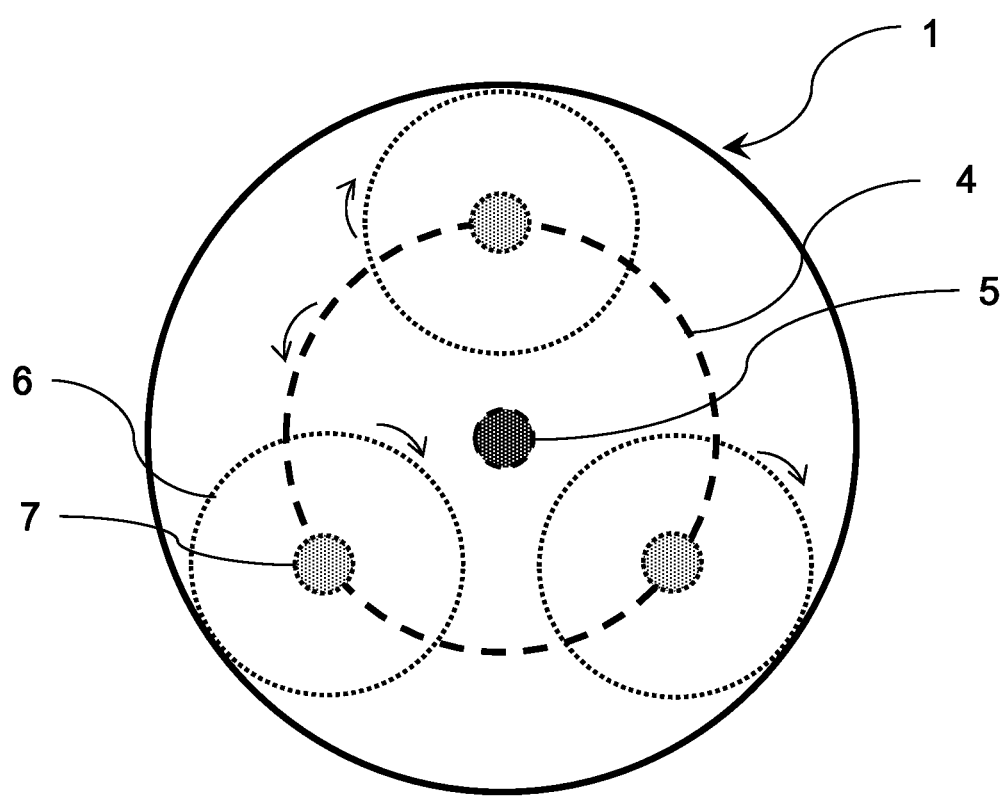
FIG. 1 is a conceptual cross-sectional view of a kneader reactor equipped with three stirring blades.

For example, FIG. 1 shows an embodiment in which three stirring blades rotating around their own axes and orbitally revolving are provided. FIG. 1 is a conceptual cross-sectional view of a kneader reactor 1 equipped with three stirring blades. The rotational axes and the revolutionary axis of the stirring blades are arranged parallel to each other in the vertical direction. Each arrow indicates a rotational direction or a revolutionary direction. Rotational shafts (axes) 7 of the stirring blades form rotational tracks 6 of the stirring blades and are arranged at the apexes of the equilateral triangle having a gravity center which is also a center 5 of the revolution part 4 for performing the revolutionary movement. As described above, in the embodiment in which three or more stirring blades rotating around their own axes and orbitally revolving are provided, the rotational shafts (axes) of the stirring blades are preferably arranged at the apexes of a regular polygon having a gravity center which is also a center of the revolution part for performing the revolutionary motion. Similarly, in the embodiment in which two stirring blades rotating around their own axes and orbitally revolving are provided, the two rotational shafts (axes) of the stirring blades am preferably arranged at both ends of a straight line having a gravity center which is also a center of the revolution part for performing the revolutionary motion.

Figure 2:
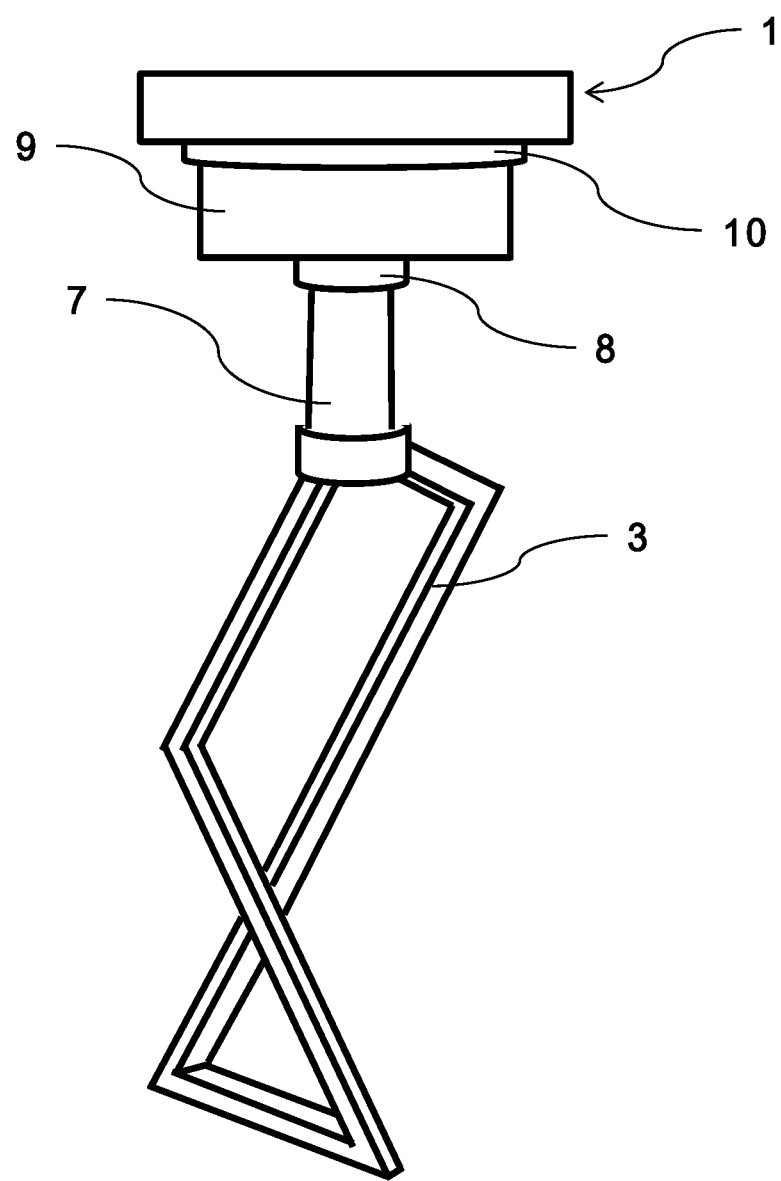
FIG. 2 shows a stirring blade connected to a kneader reactor.

In the kneader reactor, seal parts for the rotational shafts (axes) and the revolutionary shaft (axis) of the stirring blades may be placed vertically to the ground surface from the viewpoint of avoiding contacting with the reaction solution for producing HPMCAS and reducing corrosion and/or degradation of the shaft seal parts. FIG. 2 shows a stirring blade 3 connected to the kneader reactor 1. The rotational shaft seal part 8 is preferably arranged on the rotational shaft 7 of the stirring blade, and the revolutionary shaft seal part 10 is preferably arranged on the revolutionary shaft 9 of the stirring blade, both seal parts being arranged only in the upper part of the reactor so as not to come into contact with the reaction solution.

The kneader reactor comprises two or more stirring blades. The number of the stirring blades is preferably two or more, more preferably 3 to 5, from the viewpoint of sufficient stirring.

Figure 3:
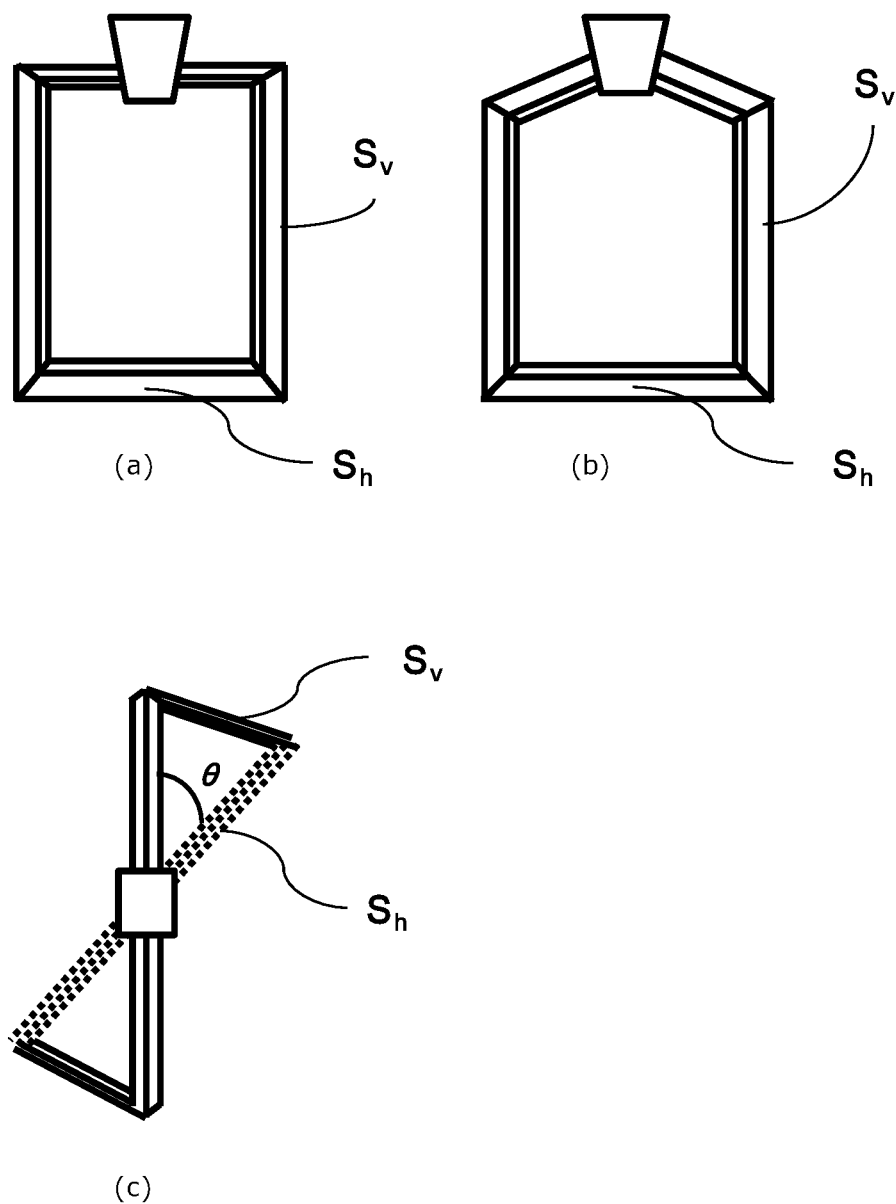
FIG. 3 shows an example of a stirring blade having a frame shape of (a) a tetragon, (b) a pentagon, or (c) a twisted tetragon.
Figure 4:
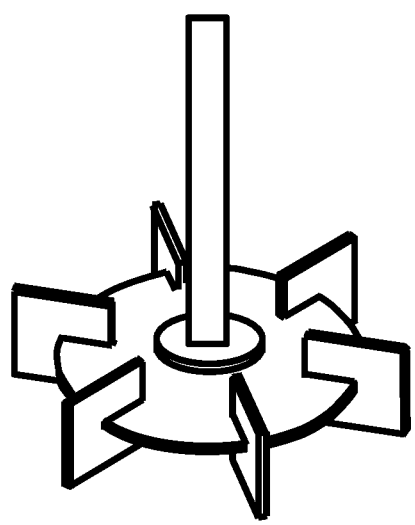
FIG. 4 shows examples of (a) a turbine-shaped stirring blade, (b) a ribbon-shaped stirring blade, and (c) an anchor-wing-shaped stirring blade.
Figure 4:
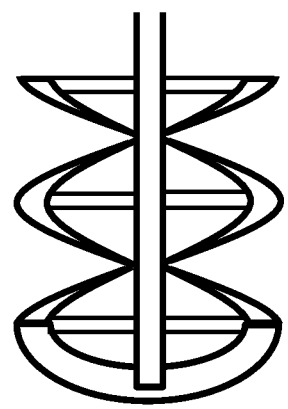
Figure 4:
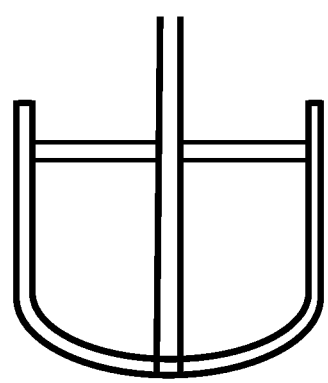

Examples of the shape of the stirring blade include frames, turbines, ribbons, and anchor wings. FIG. 3 shows an example of the stirring blade having a frame shape of (a) tetragon, (b) pentagon, or (c) twisted tetragon. FIG. 4 shows an example of the stirring blade having a shape of (a) turbine, (b) ribbon, or (c) anchor-wing.

The stirring blade preferably has a frame shape from the viewpoint of sufficient stirring. Examples of the frame shape include a tetragon (e.g., a rectangle or a square) having two sides (left and right vertical sides) vertical to the ground surface and the other two sides (upper and lower horizontal sides) parallel to the ground surface and being in contact with the rotational shaft at the center of the upper horizontal side; a pentagon (such as a home plate of the baseball game) being bent upward at a contact point with a rotational shaft at the center of said upper horizontal side of said tetragon; and a twisted tetragon having a structure in which said vertical sides of said tetragon are twisted, said lower horizontal side forms an angle of preferably 10 to 150 with said upper horizontal side, and said upper horizontal side is in contact with the rotational axis at the center of the upper horizontal side. These examples are shown in FIG. 3 (a), FIG. 3 (b) and FIG. 3 (c), respectively, where the vertical side is denoted by $S_v$, and the horizontal side is denoted by $S_h$.

Although not shown in FIG. 3, in the frame shape of the home-plate-like pentagon having the upper horizontal side bent upward at the contact point with the rotational shaft, the lower horizontal side may form an angle of preferably 10 to 150° with the imaginary straight upper horizontal side (i.e., without said bend) obtainable by connecting the upper ends of the two left and right vertical sides. Thus, the twisted pentagon may be included as an example of the frame shape.

The peripheral speed of the rotation of one stirring blade is preferably from 0.010 to 2.000 m/s, more preferably from 0.010 to 0.300 m/s, still more preferably from 0.020 to 0.200 m/s, and particularly preferably from 0.040 to 0.155 m/s, from the viewpoint of sufficient stirring.

In the present specification, the "peripheral speed of the rotation of one stirring blade" is the speed of the fastest part of one stirring blade (i.e., the speed for the outermost periphery of one stirring blade, such as for the rotational track of the stirring blade in FIG. 1) which rotates around its own axis in the kneader reactor. The peripheral speed $v_1$ (m/s) of the one stirring blade may be obtained from the diameter d (mm) of one stirring blade and the rotation speed $n_1$ (rpm) of the one stirring blade by the following equation. It is noted that rpm means the number of rotations per minute.

$$V_1 = \pi \times d \times n_1 / 60000$$

The peripheral speed of the revolution of one stirring blade is preferably from 0.001 to 2.000 m/s, more preferably from 0.001 to 0.500 m/s, still more preferably from 0.002 to 0.050 m/s, and particularly preferably from 0.002 to 0.025 m/s, from the viewpoint of sufficient stirring.

The "peripheral speed of the orbital revolution of one stirring blade" is a speed in a circular orbit drawn by the center of the rotational shaft of the stirring blade in the kneader reactor. The circumferential speed $v_2$ (m/s) of the rotational shaft of one stirring blade is obtained from the distance r (mm) from the center of the orbital revolution part to the center of the rotational shaft and the revolution speed $n_2$ (rpm) of the orbital revolution part by the following equation.

$$V_2 = 2 \times \pi \times r \times n_2 / 60000$$

The ratio of the peripheral speed of the rotation to the peripheral speed of the orbital revolution of one stirring blade is preferably from 0.005 to 200, more preferably from 1.0 to 20.0, still more preferably from 1.5 to 15.0, and particularly preferably from 2.0 to 10.0, from the viewpoint of sufficient stirring.

When two or more stirring blades are used, each peripheral speed of the rotation may be the same as or different from each other. Examples of the kneader reactor comprising two or more stirrings blades for rotation and orbital revolution include a triple arm planetary mixer (Tri-Mix produced by INOUE MFG., INC.), and a planetary mixer (produced by Asada Iron Works Co., Ltd.).

Hydroxypropyl methyl cellulose (another name: hypromellose; hereinafter also referred to as "HPMC") is a non-ionic water-soluble cellulose ether. HPMC synthesized by a known method, or commercially available HPMC may be used.

The degree of substitution (DS) of the methoxy groups of HPMC is preferably from 1.10 to 2.20, more preferably from 1.40 to 2.00, and still more preferably from 1.60 to 2.00, from the viewpoint of obtaining HPMC having the reduced number of undissolved fibers. The molar substitution (MS) of the hydroxypropoxy groups of HPMC is preferably from 0.10 to 1.00, more preferably from 0.20 to 0.80, and still more preferably from 0.2 to 0.65, from the viewpoint of obtaining HPMC having the reduced number of undissolved fibers.

It is noted that with respect to HMPC, the DS of the methoxy groups means a degree of substitution of the methoxy groups, i.e., an average number of methoxy groups per anhydroglucose unit, and the MS of the hydroxypropoxy groups means a molar substitution of the hydroxypropoxy groups, i.e., an average number of moles of hydroxypropoxy groups per mole of anhydroglucose. The DS of the methoxy groups and the MS of the hydroxypropoxy groups of HPMC may be determined by converting the values obtained by the measurement in accordance with the Japanese Pharmacopoeia Seventeenth Edition.

The viscosity at 20° C. of HPMC, as determined in a 2% by mass aqueous solution thereof, is preferably from 1.0 to 50.0 mPa·s, more preferably from 2.0 to 20.0 mPa·s, from the viewpoint of kneadability in the esterification step.

The viscosity at 20° C. of a 2% by mass aqueous solution of HPMC may be determined in accordance with the viscosity measurement by capillary tube viscometer under "Viscosity Determination" in "General Tests" of the Japanese Pharmacopoeia, Seventeenth Edition.

Examples of the aliphatic carboxylic acid include an aliphatic carboxylic acid having 2 to 4 carbon atoms such as acetic acid, propionic acid and butyric acid. The acetic acid is preferred from the viewpoint of economy.

The amount of the aliphatic carboxylic acid to be used is preferably from 3.00 to 10.00 mol, more preferably from 4.00 to 8.00 mol, relative to 1 mol of HPMC from the viewpoint of dissolving HPMC and increasing the reaction rate.

Examples of the acetylating agent include acetic anhydride and acetyl chloride. The acetic anhydride is preferred from the viewpoint of economy.

The amount of the acetylating agent to be used is not particularly limited as long as HPMCAS having the desired degree of substitution is obtained. It is preferably from 0.20 to 1.50 mol, more preferably from 0.40 to 1.30 mol, relative to 1 mol of HPMC from the viewpoint of reaction efficiency.

Examples of the succinoylating agent include succinic anhydride and succinyl chloride. The succinic anhydride is preferred from economy.

The amount of the succinoylating agent to be used is not particularly limited as long as HPMCAS having the desired degree of substitution is obtained. It is preferably from 0.10 to 1.50 mol, more preferably from 0.20 to 1.20 mol, relative to 1 mol of HPMC from the viewpoint of reaction efficiency.

The esterification reaction may be carried out in the presence of a catalyst. As the catalyst, an alkali metal carboxylate such as sodium acetate is preferred from the viewpoint of economy. The catalyst may be used singly or in combination of two or more as needed. A commercially available catalyst may be used.

The amount of the catalyst to be used may be selected in consideration of the degree of substitution of HPMCAS. It is preferably from 0.10 to 2.00 mol, more preferably from 0.30 to 1.90 mol, relative to 1 mol of HPMC from the viewpoint of reaction efficiency.

The reaction temperature in the esterification step is preferably from 60 to 120° C., more preferably from 60 to 100° C., from the viewpoint of the reaction rate.

The reaction time in the esterification step is preferably from 2 to 8 hours, more preferably from 3 to 6 hours, from the viewpoint of obtaining HPMCAS having the desired degree of substitution.

Next, the reaction product solution containing HPMCAS is mixed with water to obtain a suspension of precipitated HPMCAS in the precipitation step.

The temperature of the water is preferably from 5 to 40° C. from the viewpoint of controlling the diameters of HPMCAS particles in the suspension. The mass of the water is preferably 3.3 to 8.5 times, more preferably 3.8 to 6.5 times the mass of the reaction product solution, from the viewpoint of controlling the diameters of HPMCAS particles in the suspension.

The mixing of the reaction product solution containing HPMCAS with the water is not particularly limited and may be carried out by a conventional method.

After the precipitation step, the HPMCAS in the suspension is washed and recovered in the wash and recovery step.

According to the invention, since hydroxypropyl methyl cellulose acetate succinate having low yellowness and a low viscosity when dissolved in an organic solvent can be produced by using a kneader reactor comprising two or more stirring blades which rotate around their own axes and orbitally revolve in an esterification step of the HPMCAS production method, a washing method is not particularly limited. The washing with water is preferred from the viewpoint of removing free acetic acid and free succinic acid from the HPMCAS.

The method of washing with water is not particularly limited. Examples of the method of washing with water include a method comprising steps of: separating crude HPMCAS from a suspension through centrifugation, filtration, decantation or the like, then resuspending the obtained crude HPMC in water, while stirring with a stirrer, and subjecting the obtained suspension to centrifugation, filtration or the like to remove the water used for washing; a method comprising a step of continuously pouring water into the above-obtained crude HPMCAS; and a method comprising a step of washing HPMCAS in a suspension by repeatedly replacing a portion of a liquid in the suspension with water.

The recovered HPMCAS may be subjected to an optional drying step to obtain dried HPMCAS. The drying temperature in the drying step is preferably from 60 to 100° C., more preferably from 70 to 80° C., from the viewpoint of preventing aggregation of HPMCAS. The drying time in the drying step is preferably from 1 to 5 hours, more preferably from 2 to 3 hours, from the viewpoint of preventing aggregation of HPMCAS.

The yellowness at 20° C. of a 2% by mass solution of hydroxypropyl methyl cellulose acetate succinate in a mixed solvent of dichloromethane, methanol and water in a mass ratio of 44:44;10 is preferably 15.0 or less, more preferably 0.1 to 13.0. When the yellowness is greater than 15.0, the reduction in coloring in the coated preparation containing HPMCAS may not be satisfactory.

It is noted that the yellowness may be measured at 20° C. by providing a 2% by mass solution of HPMCAS in a mixed solvent of dichloromethane, methanol and water in a mass ratio of 44:44:10 as a sample for measurement, and analyzing the sample by using a direct reading tri-stimulus color computer such as an SM color computer SM-4 (produced by Suga Test Instruments Co., Ltd.).

The viscosity at 20° C. of a 2% by mass solution of hydroxypropyl methyl cellulose acetate succinate in a mixed solvent of dichlormethane and methanol in a mass ratio of 50:50 is preferably 140 mPa·s or less, more preferably from 80 to 130 mPa·s, from the viewpoint of increasing the concentration of HPMCAS in the coating solution.

It is noted that the viscosity may be measured using a Brookfield viscometer in accordance with the Viscosity Determination in the Japanese Pharmacopoeia Seventeenth Edition.

The DS of the methoxy groups of HPMCAS is preferably from 1.10 to 2.20, more preferably from 1.40 to 2.00, and still more preferably from 1.60 to 2.00.

The MS of the hydroxypropoxy groups of HPMCAS is preferably from 0.10 to 1.00, more preferably from 0.20 to 0.80, and still more preferably from 0.20 to 0.65.

The DS of the acetyl groups of HPMCAS is preferably from 0.10 to 2.50, more preferably from 0.10 to 1.00, and still more preferably from 0.20 to 0.80.

The DS of the succinyl groups of HPMCAS is preferably from 0.10 to 2.50, more preferably from 0.10 to 1.00, and still more preferably from 0.10 to 0.60.

The ratio of the DS of the acetyl groups to the DS of the succinyl groups of HPMCAS (acetyl group/succinyl group) is preferably from 0.50 to 4.00, more preferably from 0.80 to 3.70, from the viewpoint of solubility.

It is noted that with respect to HPMCAS, the DS of the methoxy groups, the DS of the acetyl groups, and the DS of the succinyl groups mean respective degrees of substitutions, i.e., an average number of methoxy groups per anhydroglucose unit (AGU), an average number of acetyl groups per AGU, and an average number of succinyl groups per AGU, and the MS of the hydroxypropoxy groups means a molar substitution, i.e., an average number of moles of hydroxypropoxy groups per mole of anhydroglucose.

It is noted that the DS of the methoxy groups, the DS of the acetyl groups, the DS of the succinyl groups, and the MS of the hydroxypropoxy groups of HPMCAS may be converted from the values obtained by the method in "Hypromellose Acetate Succinate" under the Official Monographs of the Japanese Pharmacopoeia Seventeenth Edition.

EXAMPLES

Hereinafter, the invention will be described in detail with reference with Examples and Comparative Example. It should not be construed that the invention is limited by or to them.

Example 1

In a 5L vertical kneader reactor (Tri-Mix TX-5 produced by INOUE MFG., INC.) equipped with three frame-shaped stirring blades (twisted pentagon having an angle of 90°, made of SCS16, produced by INOUE MFG., INC.) which could rotate around their own axes and orbitally revolve, 1120 g of glacial acetic acid was placed. The 700 g of HPMC having the DS of the methoxy groups of 1.87, the MS of the hydroxypropoxy groups of 0.24, and the viscosity at 20° C. of 3.2 mPa·s, as determined in a 2% by mass aqueous solution, 396.7 g of acetic anhydride, 141.8 g of succinic anhydride, and 338.4 g of sodium acetate were added therein to carry out the esterification reaction at 85° C. for 5 hours.

The peripheral speed of the rotation of each frame-shaped stirring blade was 0.050 m/s, the peripheral speed of the orbital revolution was 0.019 m/s, and the ratio of the peripheral speed of the rotation to the peripheral speed in the orbital revolution was 2.6. Thus, the peripheral speed of the rotation was the same in all of three frame-shaped stirring blades which rotated around their own axes and orbitally revolved. In the same manner as in FIG. 1, the rotational axes of the three frame-shaped stirring blades which rotated and orbitally revolved was arranged at the apexes of the equilateral triangle having a gravity center which was also a center of the revolutionary part for performing revolutionary motion. Each of the three frame-shaped stirring blades for rotation and orbital revolution is in a form of twisted pentagon, having two sides, left and right, vertical to the ground surface (i.e., left and right vertical sides), a side parallel to the ground surface (i.e., lower horizontal side), and two sides formed by bending the upper horizontal side upward at a central contact point with the rotational axis as shown in FIG. 3 (b), and having a structure twisted at the center of the vertical sides so as to make the lower horizontal side twisted by 90° with respect to the imaginary straight upper horizontal side (without bending) obtainable by connecting the upper ends of the left and right vertical sides. The length of the lower horizontal side (diameter) was 96 mm. The peripheral speed of the rotation was adjusted by setting the rotation speed to 10 rpm. The peripheral speed of the revolution was adjusted by setting the distance from the center of the revolution part for revolutionary motion to the center of each rotational shaft (i.e., the distance from the gravity center of the equilateral triangle to each apex of the equilateral triangle) to 57.7 mm and the revolution speed to 3.1 rpm. The axes of rotation and the axis of revolution of the stirring blades were arranged perpendicularly to the ground surface. In the same manner as in FIG. 2, the sealed parts of the shafts of rotation and revolution were arranged so as to be located only in the upper parts of the reactor for avoiding the contact with the reaction solution. In addition, the directions of the rotations were opposite to the direction of the orbital revolution.

Water of 20° C. having a mass of 5.0 times the mass of the obtained reaction product solution containing HPMCAS was gradually added to the reaction product solution to obtain a suspension of precipitated HPMCAS. The precipitated HPMCAS was filtered on an 80 mesh sieve to obtain crude HPMCAS. The obtained crude HPMCAS was washed by repeating the following process five times. The process comprised re-suspension of crude HPMCAS in water of 20° C. having a mass of 10 times the mass of starting HPMC, stirring for 10 minutes, and then filtration on an 80 mesh sieve. As a result, washed HPMCAS was obtained. Finally, the washed HPMCAS was dried at 80° C. for 3 hours to obtain HPMCAS.

The reaction conditions in the esterification step, and the degrees of substitutions, yellowness and viscosity of the obtained HPMCAS are shown in Table 1

Example 2

HPMCAS was obtained in the same manner as in Example 1 except that the ratio of each peripheral speed of the rotation to the peripheral speed of the orbital revolution of the stirring blades which rotated around their own axes and orbitally revolved in the esterification reaction was set to 3.9 by setting the rotation speed to 15 rpm.

The reaction conditions in the esterification step, and the degrees of substitutions, yellowness and viscosity of the obtained HPMCAS are shown in Table 1.

Example 3

HPMCAS was obtained in the same manner as in Example 1 except that the ratio of each peripheral speed of the rotations to the peripheral speed of the orbital revolution of the stirring blades which rotated and orbitally revolved in the esterification reaction was set to 7.9 by setting the rotation speed to 30 rpm.

The reaction conditions in the esterification reaction step, and the degrees of substitutions, yellowness and viscosity of the obtained HPMCAS are shown in Table 1.

Comparative Example 1

In a 5L lateral kneader reactor (PNV-5T produced by IRIE SHOKAI Co., Ltd.) equipped with biaxial stirring blades (Z-shaped stirring blades for PNV-5T, made of SUS316L, produced by IRIE SHOKAI Co., Ltd.), 1376 g of glacial acetic acid was placed. The 860 g of HPMC having the DS of the methoxy groups of 1.87, the MS of the hydroxypropoxy groups of 0.24, and the viscosity at 20° C. of 3.2 mPa·s, as determined in a 2% by mass aqueous solution, 487.3 g of acetic anhydride, 174.2 g of succinic anhydride, and 415.7 g of sodium acetate were added therein to carry out the esterification reaction at 85° C. for 5 hours.

The Z-shaped stirring blades were used as the stirring blades, and each peripheral speed of the rotation around its own axis was 0.18 m/s. The peripheral speed of the rotation was adjusted by setting the diameter of the stirring blade to 80 mm and the rotation speed to 43 rpm.

Water of 20° C. having a mass of 5.0 times the mass of the obtained reaction product solution containing HPMCAS was gradually added to the reaction product solution to obtain a suspension of precipitated HPMCAS. The precipitated HPMCAS was filtered on an 80 mesh sieve to obtain crude HPMCAS. The obtained crude HPMCAS was washed by repeating the following process five times. The process comprised re-suspension of crude HPMCAS in water of 20° C. having a mass of 10 times the mass of starting HPMC, stirring for 10 minutes, and then filtration on an 80 mesh sieve. As a result, washed HPMCAS was obtained. Finally, the washed HPMCAS was dried at 80° C. for 3 hours to obtain HPMCAS.

The reaction conditions in the esterification step, and the degrees of substitutions, yellowness and viscosity of the obtained HPMCAS are shown in Table 1

TABLE 1

| | reagents used for esterification reaction | | | | | | | | | | | |
|---|---|---|---|---|---|---|---|---|---|---|---|---|
| | HPMC *1 | | | | | acetic acid | | acetic anhydride | | succinic anhydride | | sodium acetate | |
| | MeO groups DS | HPO groups MS | viscosity (mPa·s) | (g) | (mol) | (g) | (mol/mol HPMC) | (g) | (mol/mol HPMC) | (g) | (mol/mol HPMC) | (g) | (mol/mol HPMC) |
| Example1 | 1.87 | 0.24 | 3.2 | 700 | 3.46 | 1120 | 5.38 | 396.7 | 1.12 | 141.8 | 0.41 | 338.4 | 1.19 |
| Example2 | 1.87 | 0.24 | 3.2 | 700 | 3.46 | 1120 | 5.38 | 396.7 | 1.12 | 141.8 | 0.41 | 338.4 | 1.19 |
| Example3 | 1.87 | 0.24 | 3.2 | 700 | 3.46 | 1120 | 5.38 | 396.7 | 1.12 | 141.8 | 0.41 | 338.4 | 1.19 |
| Comp.Ex.1 | 1.87 | 0.24 | 3.2 | 860 | 4.26 | 1376 | 5.38 | 487.3 | 1.12 | 174.2 | 0.41 | 415.7 | 1.19 |

*1 "MeO groups" mean methoxy groups, "HPO groups" mean hydroxypropoxy groups, and "viscosity" means a viscosity at 20° C. as determined in a 2% by mass aqueous solution.

TABLE 2

| | reaction conditions for esterification | | | | | product HPMCAS *1 | | | | | | |
|---|---|---|---|---|---|---|---|---|---|---|---|---|
| | peripheral speed (A) of rotation (m/s) | peripheral speed (B) of orbital revolution (m/s) | A/B | reaction temp. (° C.) | reaction time (hr) | MeO groups DS | HPO groups MS | Ac groups DS | Suc groups DS | Ac/Suc | yellowness | viscosity (mPa·s) |
| Example1 | 0.050 | 0.019 | 2.6 | 85 | 5 | 1.88 | 0.24 | 0.50 | 0.31 | 1.61 | 11.1 | 103.5 |
| Example2 | 0.075 | 0.019 | 3.9 | 85 | 5 | 1.87 | 0.24 | 0.51 | 0.31 | 1.65 | 11.4 | 104.3 |
| Example3 | 0.151 | 0.019 | 7.9 | 85 | 5 | 1.89 | 0.24 | 0.58 | 0.31 | 1.87 | 11.2 | 103.6 |
| Comp.Ex.1 | 0.180 | — | — | 85 | 5 | 1.90 | 0.24 | 0.57 | 0.30 | 1.90 | 18.8 | 147.2 |

*1 "MeO groups" mean methoxy groups, "HPO groups" mean hydroxypropoxy groups, "Ac groups" mean acetyl groups, "Suc groups" mean succinyl groups, "yellowness" means yellowness at 20° C. as determined in a 2% by mass solution of HPMCAS in a mixed solvent of dichloromethane, methanol and water in a mass ratio of 44:44:10, and "viscosity" means a viscosity measured at 20° C. in a 2% by mass solution of HPMCAS in a mixed solvent of dichloromethane and methanol in a mass ratio of 50:50.

HPMCAS produced in each of Examples 1 to 3 by subjection to the esterification step in the kneader reactor equipped with a plurality of stirring blades which rotated around their own axes and orbitally revolved, was lower in yellowness and the viscosity than HPMCAS produced in Comparative Example 1 by subjection to the esterification step in the lateral kneader reactor equipped with the biaxial stirring blades which rotated around the axes.

The invention claimed is:

1. A method for producing hydroxypropyl methyl cellulose acetate succinate comprising:

an esterification step of reacting hydroxypropyl methyl cellulose with an acetylating agent and a succinoylating agent in the presence of an aliphatic carboxylic acid in a kneader reactor equipped with two or more stirring blades rotating around their own axes and orbitally revolving, to obtain a reaction product solution containing hydroxypropyl methyl cellulose acetate succinate;

a precipitation step of precipitating the hydroxypropyl methyl cellulose acetate succinate by mixing the reaction product solution with water to obtain a suspension of the precipitated hydroxypropyl methyl cellulose acetate succinate; and a washing and recovering step of washing the hydroxypropyl methyl cellulose acetate succinate in the suspension and recovering the washed hydroxypropyl methyl cellulose acetate succinate.

2. The method for producing the hydroxypropyl methyl cellulose acetate succinate according to claim 1, wherein a shape of each of the stirring blades is selected from the group consisting of a frame, a turbine, a ribbon, and an anchor wing.

* * * * *

UNITED STATES PATENT AND TRADEMARK OFFICE
CERTIFICATE OF CORRECTION

PATENT NO. : 11,753,483 B2
APPLICATION NO. : 17/083615
DATED : September 12, 2023
INVENTOR(S) : Kitaguchi et al.

It is certified that error appears in the above-identified patent and that said Letters Patent is hereby corrected as shown below:

In the Specification

Column 3, Line 66: Please correct "150 with" to read --150° with--

Column 7, Line 1: Please correct "140 mPa-s" to read --140 mPa·s--

Column 9, Lines 18-19: Please correct "3.2 mPa-s" to read --3.2 mPa·s--

Signed and Sealed this
Thirteenth Day of February, 2024

Katherine Kelly Vidal
*Director of the United States Patent and Trademark Office*